United States Patent [19]

Michel

[11] Patent Number: 5,497,957

[45] Date of Patent: Mar. 12, 1996

[54] PROCESS AND DEVICE FOR HOMOGENIZING THE WINDING HARDNESS OF A ROLL PROFILE OF A FILM REEL

[75] Inventor: Hartmut Michel, Bruchmuehlbach, Germany

[73] Assignee: Hoechst Aktiengesellschaft, Frankfurt am Main, Germany

[21] Appl. No.: 241,332

[22] Filed: May 11, 1994

[30] Foreign Application Priority Data

May 17, 1993 [DE] Germany .......................... 43 16 383.1

[51] Int. Cl.⁶ .................................................. D06C 3/04
[52] U.S. Cl. ................................... 242/534; 226/173
[58] Field of Search ........................ 242/534, 534.1, 242/548, 548.1, 548.2, 563.1; 226/15, 17, 18, 19, 45, 170, 171, 172, 173, 174

[56] References Cited

U.S. PATENT DOCUMENTS

| | | | |
|---|---|---|---|
| 3,256,558 | 6/1966 | Andersen et al. ................ | 226/173 |
| 3,427,684 | 2/1969 | Tsien ............................... | 226/173 |
| 3,673,647 | 7/1972 | Koster ............................. | 226/17 |
| 3,881,229 | 5/1975 | Reid ................................. | 226/173 |
| 4,173,313 | 11/1979 | Rogers ............................. | 242/534 |

FOREIGN PATENT DOCUMENTS

| | | | |
|---|---|---|---|
| 0086270 | 8/1983 | European Pat. Off. ................ | 226/15 |
| 55-24719 | 2/1980 | Japan ................................... | 242/548.2 |
| 3-264112 | 11/1991 | Japan ................................... | 242/548.2 |
| 4-55017 | 2/1992 | Japan ................................... | 242/548.2 |

*Primary Examiner*—John P. Darling
*Attorney, Agent, or Firm*—Foley & Lardner

[57] ABSTRACT

Film edges 9, 9 of a film web 1 are sensed with sensor heads 4, 4. The sensor heads 4, 4 can be motor-adjusted transversely to the longitudinal direction of the film web 1. By virtue of the displacement, signals are produced which are proportional to the displacement and which activates servo valves 8, 8. These servo valves are connected to positioning cylinders 10, 10 which are in turn connected to chain-path deflector heads 6, 6. The signals of the servo valves activate the adjustment cylinders, which then adjust the chain-path deflector heads and thus drive them in response to movement of the film edges. By virtue of the adjustment of the chain-path deflector heads, the paths of the clip chains 14, 14 are also adjusted, resulting in a variation of the grasping depths of the film strip held firmly by the clips. This brings about an oscillating movement of the film web after the feed-in into the transverse stretching frame 16.

11 Claims, 4 Drawing Sheets

PROCESS AND DEVICE FOR HOMOGENIZING THE WINDING HARDNESS OF A ROLL PROFILE OF A FILM REEL

BACKGROUND OF THE INVENTION

The present invention relates to a process for homogenizing the winding hardnesses of a roll profile of a film reel, in which a frame feed-in control for the film web is driven following the film edges. The invention also relates to a device.

Despite highly developed closed-loop control technology for adjusting the die gap of slit dies, extruded films have so-called permanences. These permanences are thin/thick points which are distributed over the width profile of the film and can be encountered for long periods of time always at the same points on the film-width profile. These permanences are the consequence of the finite number of adjustment screws in the upper die lip for adjusting the die gap. These permanences can be assigned to the distances between these adjustment screws, which are generally approximately 25 mm. These permanences, which are first to be encountered in the prefilm, are also retained during the longitudinal and transverse stretching of the prefilm to form the final film. During winding of the final film to form a film reel, these thin and thick points in the film reel accumulate and lead to varying winding hardnesses across the roll width of the film reel. In the case of relatively long storage times of the film reels or film rolls, these varying winding hardnesses in turn lead to irreparable straining of the film, so that the film may become unusable.

To avoid the adverse effects of these permanences, it is known to traverse the winding core of the film reel during winding, that is to say, to move it back and forth across the width of the film web. The mechanics and control for this traversing of the winding core are very complicated.

Other measures for preventing these permanences consist in introducing the longitudinally stretched prefilm in an oscillating manner into the transverse stretching frame to achieve an oscillation of the thin/thick points transversely to the film travel direction and thus to distribute the permanences uniformly across the width of the film reel without accumulating them at specific points. The oscillating introduction of the longitudinally stretched prefilm into the transverse stretching frame may be achieved by various measures. One of these is a targeted movement of a roll, for example, a deviation from the horizontal, upstream of the transverse stretching frame, with simultaneous stoppage of the frame feed-in control. Another measure consists in carrying out a selective prefilm trimming, in which broad edge strips are cut off alternately on both sides of the film web, depending on the run length, while maintaining a constant width of the trimmed prefilm. The displacement of the film edges by the traversing trimming is followed by the frame feed-in control, and as a result an oscillating transverse displacement of the thin/thick points of the prefilm results.

SUMMARY OF THE INVENTION

It is therefore an object of the present invention to provide an improved method for eliminating permanences and/or the adverse effects thereof. It is a particular object to provide a method for transverse stretching of a longitudinally stretched prefilm to form a final film, and for its winding to form a film reel, such that the thin/thick points of the final film, caused by the closed-loop control of the die-gap width of the slit die, do not come to lie one above the other on the film reel.

It is also an object of the present invention to provide an improved device for homogenizing the winding hardnesses of a roll profile of a film web rolled on a film reel.

In accomplishing the foregoing objects, there has been provided in accordance with one aspect of the present invention a method for homogenizing the winding hardnesses of a roll profile of a film web rolled on a film reel, comprising the steps of producing a prefilm; transversely stretching the prefilm in a frame device having clip chains bearing clips for grasping the edges of the prefilm, to produce a film web; and winding the film web on a film reel, wherein the step of transversely stretching the prefilm includes the steps of introducing lateral movement with respect to the prefilm edges upstream of the frame device, and, in response to said lateral movement with respect to the prefilm edges, adjusting the position of the clip chains for the transverse stretching of the prefilm to adjust the grasping depths of the clips for grasping laterally into the edge regions of the prefilm during the transverse stretching.

In accordance with another aspect of the invention, there has been provided a device for homogenizing the winding hardnesses of a roll profile of a film web rolled on a film reel, comprising: a transverse stretching frame having clip chains mounted on chain-path deflector heads, and a frame feed-in control device for the film web, said frame feed-in control device comprising a pair of sensor heads upstream of the entrance to the transverse stretching frame for sensing the film edges of a prefilm, a setting screw for displacing each of the sensor heads transversely to the film web and with respect to chain-path deflector heads, and a closed-loop control device for adjusting the setting screws.

Further objects, features and advantages of the present invention will become apparent from the detailed description of preferred embodiments that follows, when considered in light of the attached figures of drawing.

BRIEF DESCRIPTION OF THE DRAWINGS

The invention is explained in greater detail below with the aid of the drawings, in which.

DETAILED DESCRIPTION OF THE PREFERRED EMBODIMENTS

According to the method of the invention, clips, together with the clip chains for the transverse stretching of a longitudinally stretched prefilm, are adjusted in their positions for grasping the film edges during the transverse stretching. By this means, the grasping depths of the clips for the edge regions of the film web are controlled as a function of time on both sides.

As a preferred modification of the process, the two film edges are sensed by a sensor head in each case, there are present on the two sensor-head holders motor-adjustable setting screws whose adjustment is controlled electronically, and the sensor heads are moved with respect to chain-path deflector heads. The sensor heads are preferably moved in an oscillating manner during their motor adjustment.

The improved device for homogenizing the winding hardness of a roll profile of a film reel includes a transverse stretching frame and a frame feed-in control for the film web, with sensor heads upstream of the entrance to the transverse stretching frame for sensing the film edges of a longitudinally stretched prefilm, such that each of the sensor heads is displaced by a setting screw, adjustable transversely to the film web, with respect to chain-path deflector heads and such that a closed-loop control device is provided for adjusting the setting screws. In a further preferred development of the device, each of the sensor heads is connected to a servo valve which is activated by a signal from the sensor head, which is initiated by a relative displacement of the film edges of the prefilm with respect to the sensor heads.

The invention achieves the advantage that a targeted relative adjustment of the sensor heads of the frame feed-in control, with respect to the chain-path deflector heads, results in control of the grasping depth of the film by the clips in the clip chain. Since this relative adjustment is carried out with defined time dependency at both sensor heads in the same direction, transversely to the travel direction of the film, that is to say the sensor heads are adjusted together to the right or left, this first causes an oscillation of the chain-path deflector heads and a variation of the path of the clip chains and, downstream of the first fixed spindle of the clip-chain path, an oscillation of the film.

Figure 1:
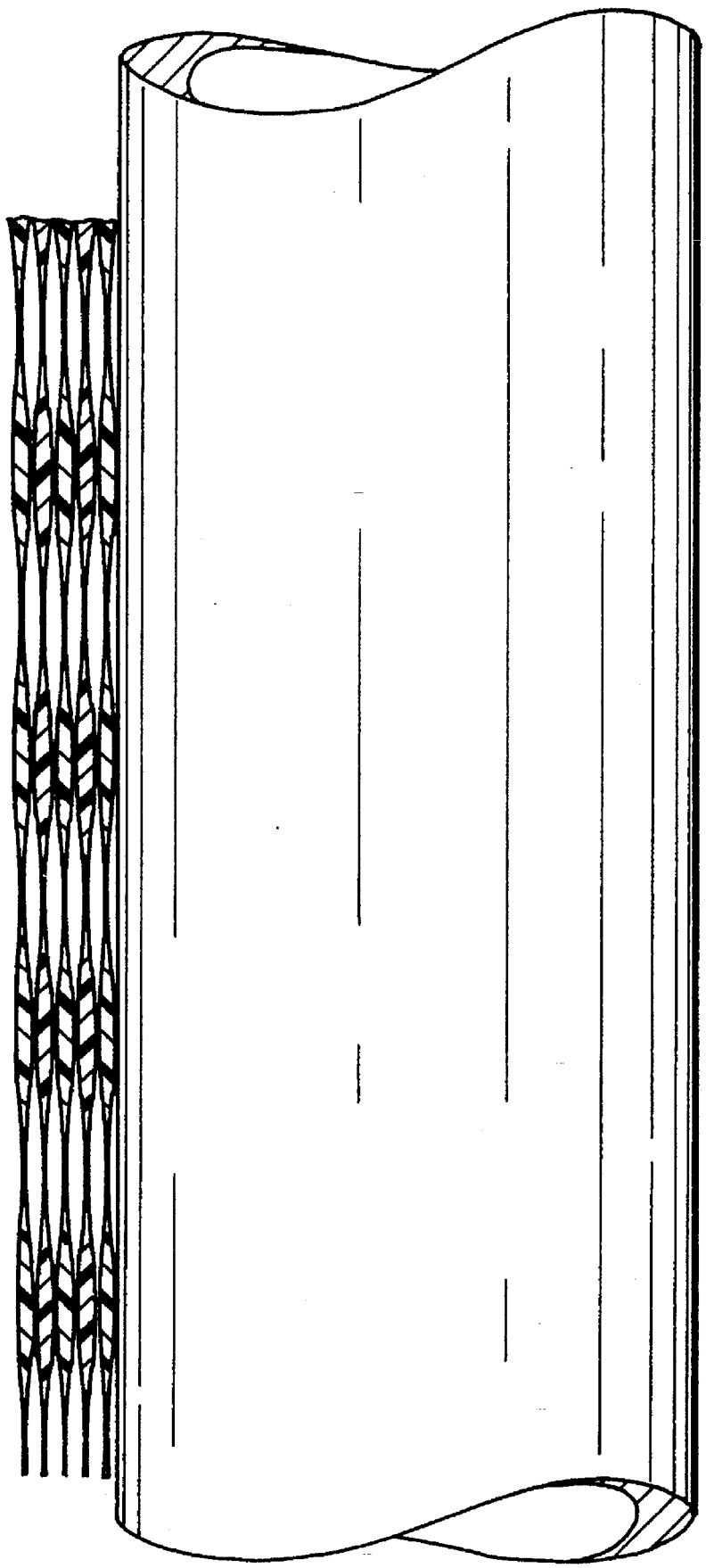
FIG. 1 shows diagrammatically a roll profile of a film reel with thin/thick points (permanences)

Turning now to the drawings, FIG. 1 shows diagrammatically thin/thick points, distributed across the width of a film reel. These thin and thick points are by no means distributed uniformly across the width of the film reel. Their positions depend rather on how the adjustment screws of the die lip of the slit die are adjusted, namely, whether they exert tension or compression on the die lip. A thick point is produced in the prefilm at the point at which an adjustment screw of the die lip of the slit die is set to tension, whereas a thin point corresponds to a position at which an adjustment screw exerts pressure on the die lip. As is known, the adjustment screws of a slit die are adjusted so that the extruded prefilm is thicker in the center than at the edges, since the transverse stretching of the prefilm takes place from the center, in order to obtain a final film ultimately having a uniform thickness profile across the film width and length.

Figure 2:
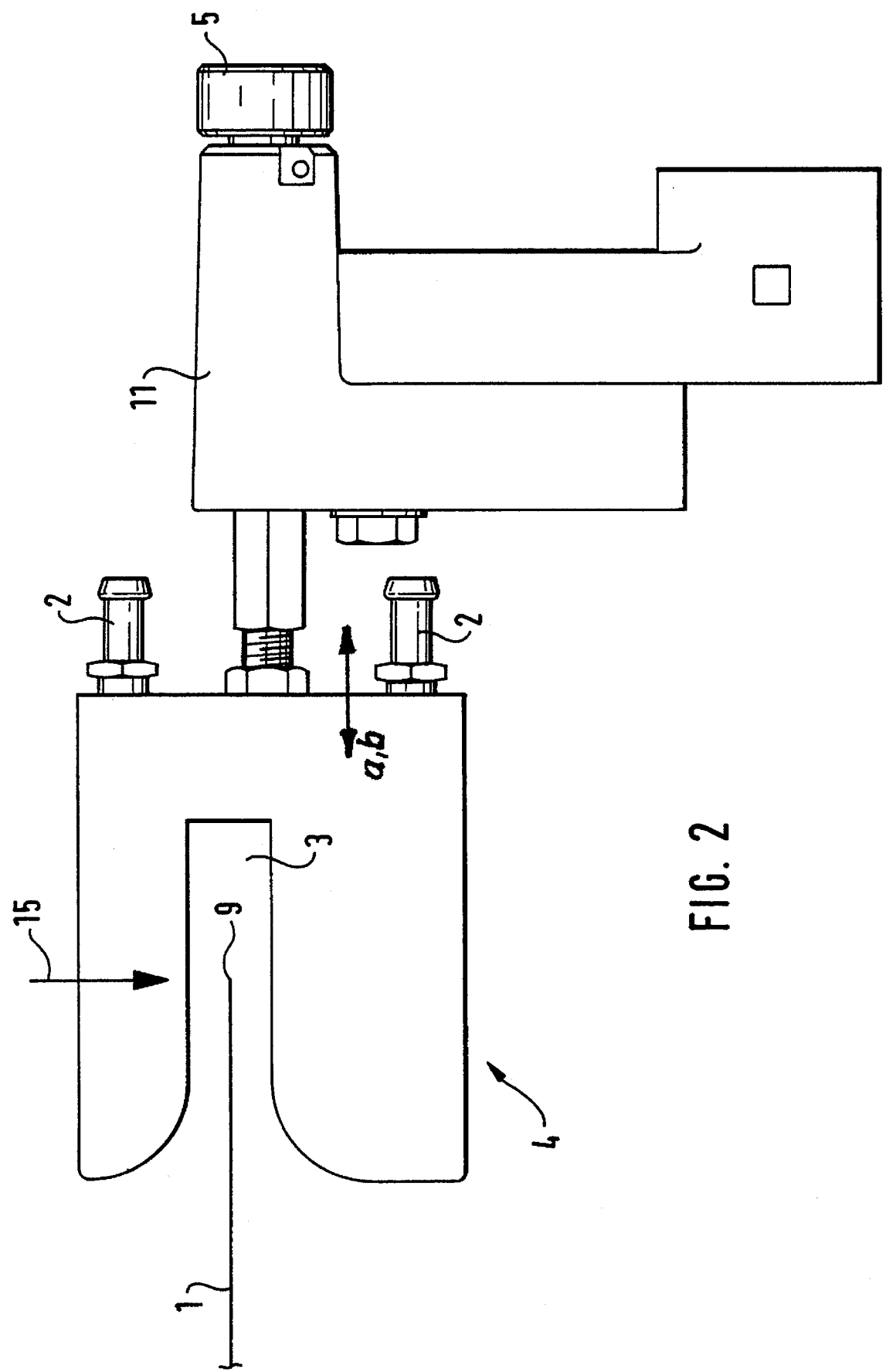
FIG. 2 shows a side view of a sensor head with a setting device for the lateral adjustment of the sensor head.

FIG. 2 shows a sensor head 4 for the control of a film edge 9 of a film web 1. The control is located at the entrance of a transverse stretching frame 16 (cf. FIG. 3) and serves for adjustment of a chain-path deflector head 6, so as, in the end effect, to cause the film web 1 to oscillate, as is described in even greater detail below.

The sensor head 4 has a gap 3 through the center of which the film web 1 travels. To keep the film web 1 in the center of the gap 3, a supporting bar or supporting roll (not shown) is expediently installed upstream of the sensor head. Such a guide of the film web 1 is also appropriate in the case of undulating film edges to avoid abrasion and fluttering of the film web in the sensor head. It is also possible for the film web to abrade slightly over the fork of the sensor head, which is disposed opposite the blown-air side, that is to say, the sensor head 4 supports the film web 1 to avoid fluttering of the film web 1.

The film web 1 in the gap 3 is acted on at its upper surface by blown air 15, which allows exact sensing of the film edge 9. If the film web 1 deviates to the left or right from its setpoint position (with respect to the sensor heads), the blown air 15 is incident either completely, proportionally to the deviation from the setpoint position, or not at all on a sensor in the sensor head 4. In corresponding proportion to the received blown air 15, the sensor head transmits, via one of its two connections 2 and the associated line, a pneumatic signal to a servo valve 8, which transmits a signal proportional to the deviation, via hydraulic lines, to adjustment cylinders 10 which adjust the chain-path deflector heads 6. A setting screw 5 passes through a sensor-head holder 11 and is in engagement with the sensor head 4 so that the latter can be adjusted horizontally. Furthermore, the sensor head 4 may be adjusted vertically so that film webs arranged at variable height can pass through the gap 3.

Figure 3:
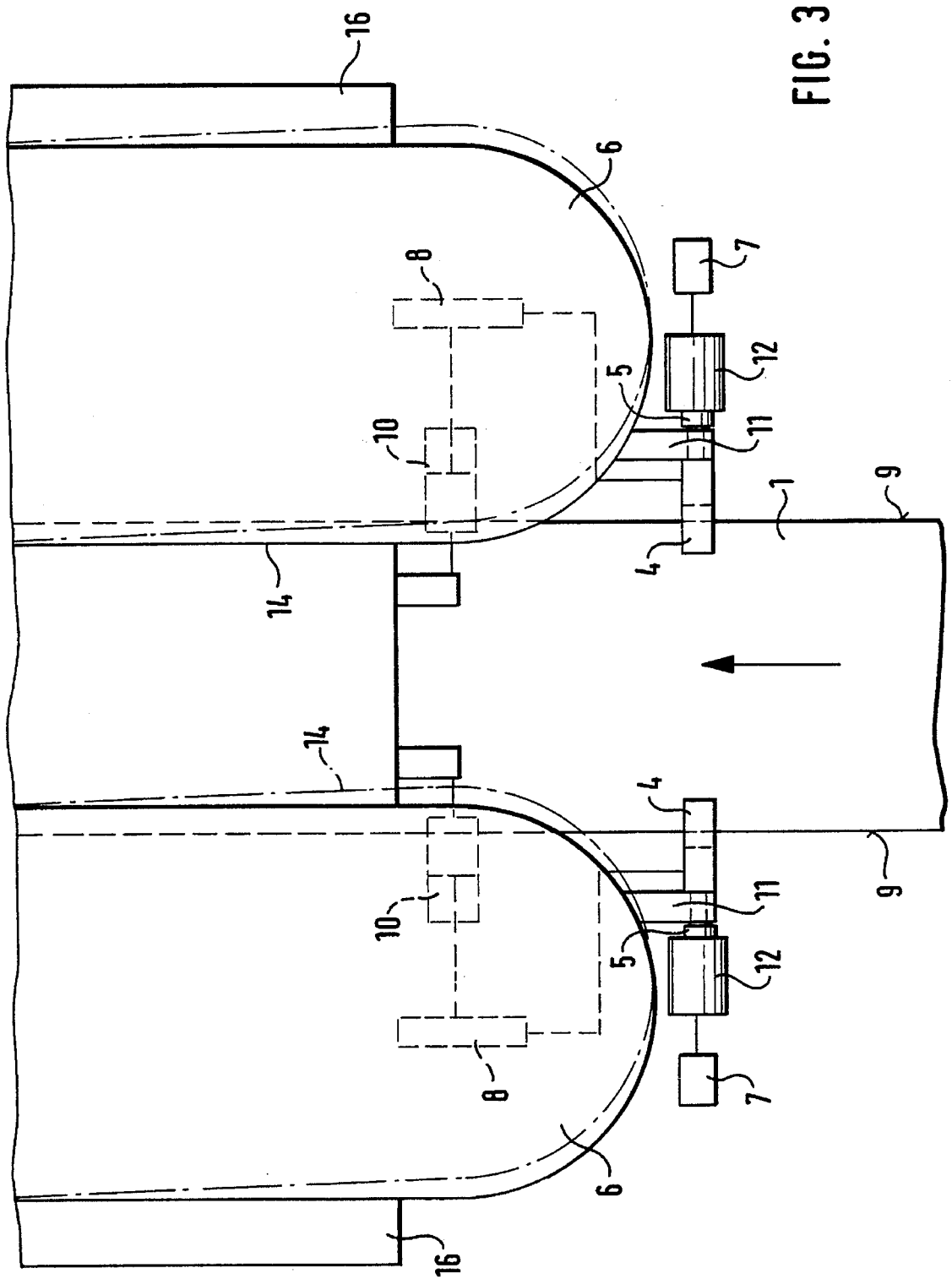
FIG. 3 shows a diagrammatic plan view of a feed-in control for a transverse stretching frame for traversing a longitudinally stretched prefilm.

With the aid of FIG. 3 there will be described in greater detail a feed-in control associated with the transverse stretching frame 16 for traversing the film web 1, which is a prefilm longitudinally stretched after extrusion. The feed-in control comprises two sensor heads 4, 4, stepping motors 12, 12, closed-loop control devices 7, 7 and adjustment cylinders 10, 10 which are connected via servo valves 8, 8 to the sensor heads 4, 4. The film edges 9, 9 are sensed by the two sensor heads 4, 4. Each sensor head 4 is adjusted transversely to the longitudinal direction of the film web 1 by the associated stepping motor 12, which drives the setting screw 5 of the sensor head. The stepping motors 12, 12 run synchronously and are controlled, either by a common closed-loop control device (not shown) or by a closed-loop control device 7, in each case such that they displace the sensor heads 4, 4 by a specific distance to the left or right as a function of time. In the process, the sensor heads 4, 4 are adjusted at a rate of 1 to 2 mm per minute. The overall path for the adjustment of the sensor heads 4, 4 is up to approximately 15 mm. The sensor heads 4, 4 are connected to the servo valves 8, 8 which, in turn, are activated by the signals of the sensor heads 4, 4. As was stated above in the description of FIG. 2, the signals of the sensor heads 4, 4 are initiated by a displacement of the film edges 9, 9 of the film web 1. Each servo valve 8 is connected to a positioning cylinder 10 which is activated by the signal of the associated servo valve. The positioning cylinders 10, 10 are connected to the chain-path deflector heads 6, 6, and the latter are adjusted based on the displacements of the film edges 9, 9. The feed-in control thus serves to drive the chain-path deflector heads 6, 6 at the entrance to the transverse stretching frame 16 in response to or following the movement of the film web 1.

Figure 4:
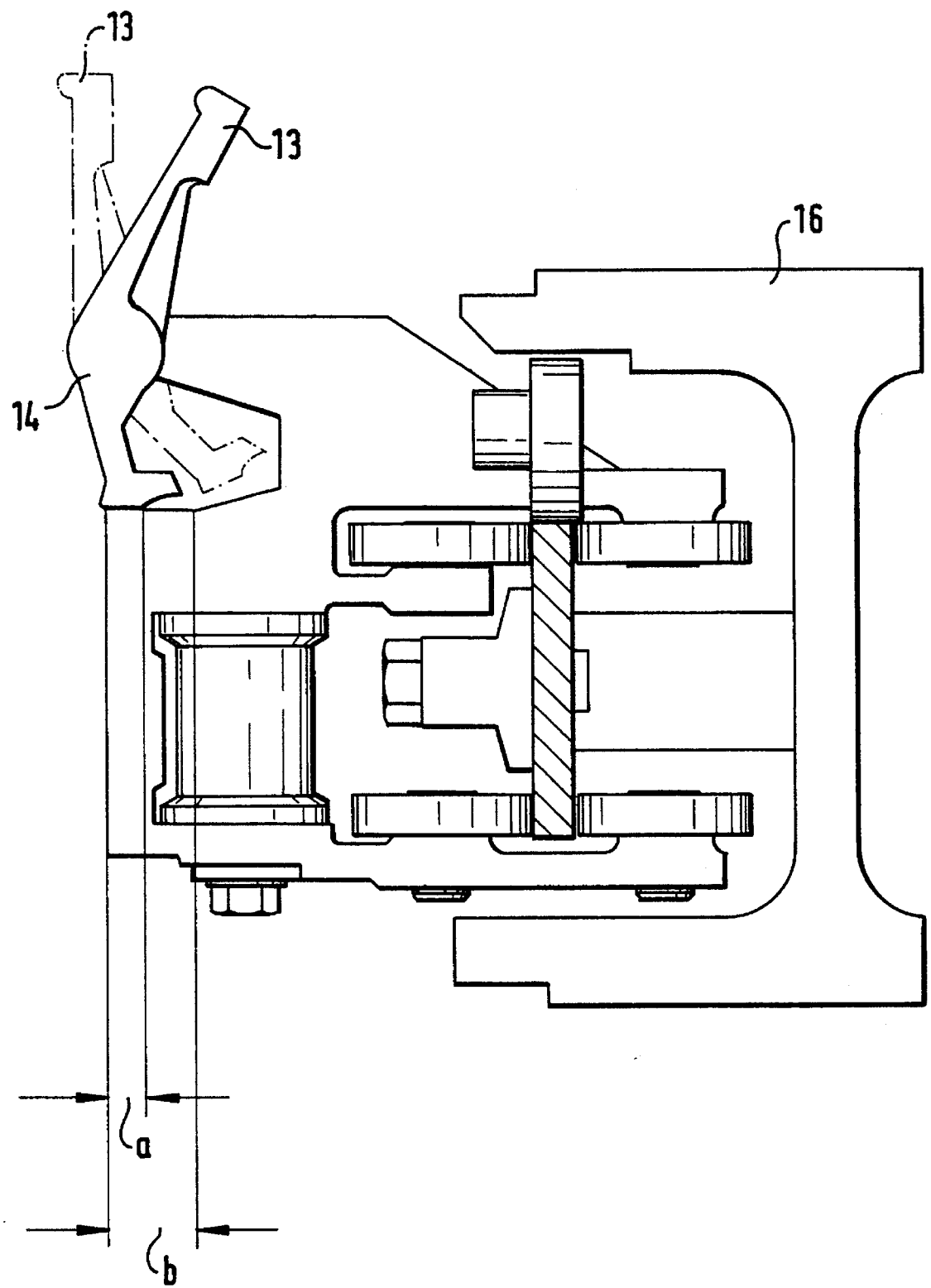
FIG. 4 shows a section through a clip chain and the clips attached thereto with two different grasping depths of the clips.

As can be seen from FIG. 4, the grasping depth of clips 13, which are attached to clip chains 14, 14, changes when adjustment is made to the chain-path deflector heads 6, 6 and, as a result, also the paths of the clip chains 14, 14, which are guided around the chain-path deflector heads. Grasping depth a or b, respectively, is understood to mean the width of the strips of the film web 1 held firmly by the clips 13. Each of these strips is delimited by the film edge 9 and the front edge of the closed clips. The actuation of the setting screws 5, 5 generates a relative movement between the chain-path deflector heads 6, 6 and the sensor heads 4, 4. The actuation of the setting screws 5, 5 also brings into position the sensor heads 4, 4 with respect to the clip chains 14, 14 and adusts the grasping depth a, b of the clips 13 from the front edge of the closed clips to the film edge 9 as indicated in FIG. 2 by the double arrow a, b which illustrates the setting of the grasping depth. The adjustment of the chain-path deflector heads 6, 6 also effects an adjustment of the path of the clip chains 14, 14 and thus also a variation of the grasping depth of the closed clips 13.

With the aid of the stepping motors 12, 12, which adjust the setting screws 4, 4, together with the electronic closed-loop control device 7, which possesses an actual-value acquisition for the sensor heads 4, 4, the sensor heads 4, 4 are moved in an oscillating manner, by which is to be understood that they are displaced jointly either to the left or to the right, transversely to the longitudinal direction of the film web 1. The respective adjustment of the sensor heads 4, 4 to the right and to the left subsequently effects, at first, a displacement or an oscillation of the chain-path deflector heads 6, 6 and then, downstream of the first fixed spindle of the clip paths, an oscillation of the film web 1.

Instead of the setting screws with the stepping motors, sensor heads may also be provided which move on slide rails and whose adjustment or oscillation is carried out by hydraulic or pneumatic cylinders.

By virtue of the oscillation of the film web 1 by approximately 1 to 2 mm per minute after the feed-in into the transverse stretching frame 16, it is achieved that, during winding of the final film, the thin and thick points of the individual film layers do not come to lie one on top of the other but are rather offset in each case with respect to one another in the transverse direction of the film reel.

What is claimed is:

1. A method for homogenizing the winding hardnesses of a roll profile of a film web rolled on a film reel, comprising the steps of:

producing a prefilm;

transversely stretching the prefilm in a frame device having clip chains bearing clips for grasping the edges of the prefilm, to produce a film web; and winding the film web on a film reel, wherein the step of transversely stretching the prefilm includes the steps of introducing lateral movement with respect to the prefilm edges upstream of the frame device, and, in response to said lateral movement with respect to the prefilm edges, adjusting the position of the clip chains for the transverse stretching of the prefilm to modify the grasping depths of the clips for grasping laterally into the edge regions of the prefilm during the transverse stretching; and wherein the adjusting of the grasping depths of the clips for the edge regions of the film web is controlled as a function of time on both sides.

2. A method for homogenizing the winding hardnesses of a roll profile of a film web rolled on a film reel, comprising the steps of:

producing a prefilm;

transversely stretching the prefilm in a frame device having clip chains bearing clips for grasping the edges of the prefilm, to produce a film web; and winding the film web on a film reel;

wherein the step of transversely stretching the prefilm includes the steps of introducing lateral movement with respect to the prefilm edges upstream of the frame device, and, in response to said lateral movement with respect to the prefilm edges, adjusting the position of the clip chains for the transverse stretching of the prefilm to modify the grasping depths of the clips for grasping laterally into the edge regions of the prefilm during the transverse stretching; and wherein said step of introducing lateral movement with respect to the prefilm edges comprises the steps of sensing each film edge by a separate sensor head movably mounted, and adjusting the position of the sensor heads to produce lateral displacement of the sensor heads with respect to adjustable chain-path deflector heads.

3. A method as claimed in claim 2, wherein said adjusting of the sensor heads is carried out by means of electronically controlled, motor-driven setting screws acting on the sensor heads.

4. A method as claimed in claim 2, wherein the chain-path deflector heads are moved in an oscillating manner during their adjustment, thereby producing oscillating displacement of the clip chains, whereby downstream of the frame device the film web oscillates and wherein the oscillating displacement of the chain-path deflector heads changes the grasping depths of the clips of the clip chains.

5. A method as claimed in claim 2, wherein the sensor heads are adjusted at a rate of 1 to 2 mm/min with respect to the clip chains.

6. A method as claimed in claim 5, wherein the overall path for the adjustment of the sensor heads is up to 15 mm.

7. A device for homogenizing the winding hardnesses of a roll profile of a film web rolled on a film reel, comprising: a transverse stretching frame having clip chains mounted on chain-path deflector heads, and a frame feed-in control device for the film web, said frame feed-in control device comprising a pair of sensor heads upstream of the entrance to the transverse stretching frame for sensing the film edges of a prefilm, a setting screw for displacing each of the sensor heads transversely to the film web and with respect to chain-path deflector heads, and a closed-loop control device for adjusting the setting screws.

8. A device as claimed in claim 7, wherein said frame feed-in control device further comprises a sensor-head holder through which each of the individual setting screws passes, and a stepping motor connected to each setting screw and controlled by said closed-loop control device.

9. A device as claimed in claim 7, wherein each of the sensor heads is connected to a servo valve which is activated by a signal from the sensor head, which is initiated by a displacement with respect to the edges of the prefilm.

10. A device as claimed in claim 9, wherein each of the servo valves is connected to a positioning cylinder, and wherein signals from the servo valves actuate the positioning cylinders to readjust the chain-path deflector heads by an amount corresponding to the displacements with respect to the film edges.

11. A device as claimed in claim 10, wherein the clip chains and attached clips are guided around the chain-path deflector heads, and wherein the displacement of the chain-path deflector heads adjusts the clip chains transversely to the travel direction of the film web and changes the grasping depths of the clips.

* * * * *